US010423765B2

(12) United States Patent
Michizono

(10) Patent No.: US 10,423,765 B2
(45) Date of Patent: Sep. 24, 2019

(54) APPARATUS AND SYSTEM FOR MANAGING AUTHORITY INFORMATION TO PERMIT OPERATION OF HARDWARE RESOURCE

(71) Applicant: FUJITSU LIMITED, Kawasaki-shi, Kanagawa (JP)

(72) Inventor: Masatoshi Michizono, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 176 days.

(21) Appl. No.: 15/619,587

(22) Filed: Jun. 12, 2017

(65) Prior Publication Data
US 2018/0025136 A1 Jan. 25, 2018

(30) Foreign Application Priority Data
Jul. 19, 2016 (JP) ................................ 2016-141629

(51) Int. Cl.
*G06F 21/00* (2013.01)
*G06F 21/12* (2013.01)
*G06F 11/07* (2006.01)
*G06F 21/51* (2013.01)
*G06F 21/73* (2013.01)
*G06F 21/10* (2013.01)

(52) U.S. Cl.
CPC .......... *G06F 21/12* (2013.01); *G06F 11/0763* (2013.01); *G06F 21/51* (2013.01); *G06F 21/73* (2013.01); *G06F 21/10* (2013.01)

(58) Field of Classification Search
CPC ...... G06F 11/0763; G06F 21/73; G06F 21/51; G06F 21/12; G06F 21/10
See application file for complete search history.

(56) References Cited

U.S. PATENT DOCUMENTS 8,014,308 B2* 9/2011 Gates, III ................ H04L 12/66
370/252
9,515,877 B1* 12/2016 Tempel ............... H04L 41/0806
10,187,371 B1* 1/2019 Casillas ............... H04L 63/145
(Continued)

FOREIGN PATENT DOCUMENTS

JP 2007-233705 9/2007
JP 2009-303118 12/2009

*Primary Examiner* — Don G Zhao
(74) *Attorney, Agent, or Firm* — Fujitsu Patent Center

(57) ABSTRACT

An information processing apparatus includes a memory and a processor. The memory is configured to store first authority information, the first authority information including information for specifying a hardware resource, the first authority information being used for determining whether or not to permit operation of the hardware resource. The processor is coupled to the memory. The processor is configured to perform accepting a request for transmitting the first authority information to a destination apparatus, determining, in response to the request, whether second authority information is set or not, the second authority information being used for making a copy feasibility determination of the first authority information, transmitting the first authority information to the destination apparatus together with the second authority information when the second authority information is set and deleting the second authority information set in the transmitted first authority information.

12 Claims, 11 Drawing Sheets

(56) References Cited

U.S. PATENT DOCUMENTS

| | | | | |
|---|---|---|---|---|
| 2003/0163712 | A1* | 8/2003 | LaMothe | G06F 21/123 713/189 |
| 2004/0243343 | A1* | 12/2004 | Nelson | G06Q 40/06 702/182 |
| 2005/0208977 | A1* | 9/2005 | Mori | H04M 1/274558 455/564 |
| 2005/0251488 | A1* | 11/2005 | Saunders | G06F 21/121 705/59 |
| 2006/0064756 | A1* | 3/2006 | Ebert | G06F 21/123 726/26 |
| 2006/0069652 | A1* | 3/2006 | Ebihara | G06F 21/10 705/59 |
| 2006/0179058 | A1* | 8/2006 | Bram | G06F 21/121 |
| 2008/0005033 | A1* | 1/2008 | Clark | G06F 21/121 705/59 |
| 2008/0215886 | A1* | 9/2008 | Nakagawa | G06F 21/6218 713/171 |
| 2009/0052671 | A1* | 2/2009 | Bauchot | G06F 21/10 380/277 |
| 2009/0310787 | A1 | 12/2009 | Nishimi | |
| 2010/0251102 | A1* | 9/2010 | Chen | G06F 16/9577 715/243 |
| 2011/0055555 | A1* | 3/2011 | Michaelis | G06F 21/10 713/156 |
| 2011/0258633 | A1* | 10/2011 | Matsumura | G06F 9/468 718/104 |
| 2011/0261699 | A1* | 10/2011 | Nishida | H04L 65/1073 370/241 |
| 2012/0124611 | A1* | 5/2012 | Shintani | G06Q 30/0251 725/25 |
| 2012/0131345 | A1* | 5/2012 | Dadu | G06F 21/105 713/176 |
| 2012/0255025 | A1* | 10/2012 | Roshchin | G06F 21/105 726/26 |
| 2013/0057896 | A1* | 3/2013 | Ito | H04N 1/00204 358/1.14 |
| 2013/0110726 | A1* | 5/2013 | Pereira | G06F 21/105 705/59 |
| 2015/0051863 | A1* | 2/2015 | Tsuchida | G01R 31/319 702/123 |
| 2015/0066417 | A1* | 3/2015 | Kimura | G11C 29/56 702/123 |
| 2015/0143468 | A1* | 5/2015 | Hebert | H04L 63/10 726/4 |
| 2016/0316363 | A1* | 10/2016 | Li | H04W 12/04 |
| 2018/0024866 | A1* | 1/2018 | Yoshimura | G06F 9/45558 709/226 |
| 2018/0198802 | A1* | 7/2018 | Dawes | H04L 67/12 |
| 2018/0338241 | A1* | 11/2018 | Li | H04L 12/2809 |

* cited by examiner

FIG. 2

```
---- BEGIN ----
OPERABLE CORE COUNT: 2
VALID TERM: INDEFINITE TERM
ACTIVATION KEY S/N: 10000
APPLICABLE MODEL: ABC xx
APPARATUS UNIQUE INFORMATION 1: 1234567890
APPARATUS UNIQUE INFORMATION 2: 0123456789
APPARATUS UNIQUE INFORMATION 3:
APPARATUS UNIQUE INFORMATION 4:
---- END ----
```

| ACCEPTABILITY DETERMINATION TABLE | | |
|---|---|---|
| SELF MODEL | MODEL C | |
| HIGHER-ORDER MODEL | MODEL D | MODEL E |
| LOWER LIMIT FREQUENCY | 2.8GHz | |

FIG. 10

```
---- BEGIN ----
OPERABLE CORE COUNT: 2
VALID TERM: INDEFINITE TERM
ACTIVATION KEY S/N: 10000
APPLICABLE MODEL: ABC xx
APPARATUS UNIQUE INFORMATION 1: 1234567890
APPARATUS UNIQUE INFORMATION 2: 0123456789
APPARATUS UNIQUE INFORMATION 3:
APPARATUS UNIQUE INFORMATION 4:
---- END ----
```

⬇ COPY

```
---- BEGIN ----
OPERABLE CORE COUNT: 2
VALID TERM: INDEFINITE TERM
ACTIVATION KEY S/N: 10000
APPLICABLE MODEL: ABC xx
APPARATUS UNIQUE INFORMATION 1: 1234567890
APPARATUS UNIQUE INFORMATION 2: 0123456789
APPARATUS UNIQUE INFORMATION 3: 9012345678   ⬅ ADDED
APPARATUS UNIQUE INFORMATION 4:
---- END ----
```

APPARATUS AND SYSTEM FOR MANAGING AUTHORITY INFORMATION TO PERMIT OPERATION OF HARDWARE RESOURCE

CROSS-REFERENCE TO RELATED APPLICATION

This application is based upon and claims the benefit of priority of the prior Japanese Patent Application No. 2016-141629, filed on Jul. 19, 2016, the entire contents of which are incorporated herein by reference.

FIELD

The embodiments discussed herein are related to an information processing apparatus and an information processing system.

BACKGROUND

An information processing apparatus that enables a hardware resource to operate is utilized, the hardware resource being specified by authority information in a plurality of mounted hardware resources. The authority information includes, e.g., information for specifying the hardware resource that is permitted to operate. The authority information is also referred to as an activation key or a license key.

DOCUMENTS OF RELATED ARTS

Patent Documents

[Patent Document 1] Japanese Laid-open Patent Publication No. 2009-303118
[Patent Document 2] Japanese Laid-open Patent Publication No. 2007-233705

SUMMARY

One aspect of the technology of the disclosure is exemplified by an information processing apparatus that follows. An information processing apparatus includes a memory and a processor. The memory is configured to store first authority information, the first authority information including information for specifying a hardware resource, the first authority information being used for determining whether or not to permit operation of the hardware resource. The processor is coupled to the memory. The processor is configured to perform accepting a request for transmitting the first authority information to a destination apparatus, determining, in response to the request, whether second authority information is set or not, the second authority information being used for making a copy feasibility determination of the first authority information, transmitting the first authority information to the destination apparatus together with the second authority information when the second authority information is set and deleting the second authority information set in the transmitted first authority information.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 2 is a diagram illustrating one example of information registered in an activation key;
FIG. 7 is a diagram illustrating one example of an acceptability determination table;
FIG. 10 is a diagram illustrating one example of the processes of copying the activation key.

DESCRIPTION OF EMBODIMENTS

The authority information is purchased, per information processing apparatus, from a vendor and other equivalent sellers. When an information processing system including the plurality of information processing apparatuses is used, the authority information is purchased for every information processing apparatus. Consequently, the authority information is purchased for the information processing apparatus ensured as, e.g., a standby system of the information processing system.

As far as the authority information can be copied, the copied authority information can be used for the information processing apparatus ensured as the standby system. However, the authority information is set copyable without any limitation, in which case such a possibility exists that the authority information copied limitlessly is used unlawfully.

Under such circumstances, one aspect of a technology of the disclosure aims at providing an information processing apparatus capable of restraining a spread of authority for copying authority information, while permitting a copy of authority information.

An information processing system according to one embodiment will hereinafter be described with reference to the drawings. A configuration of the following embodiment is an exemplification, and a technology of the disclosure is not limited to the configuration of the embodiment.

Embodiment

Figure 1:
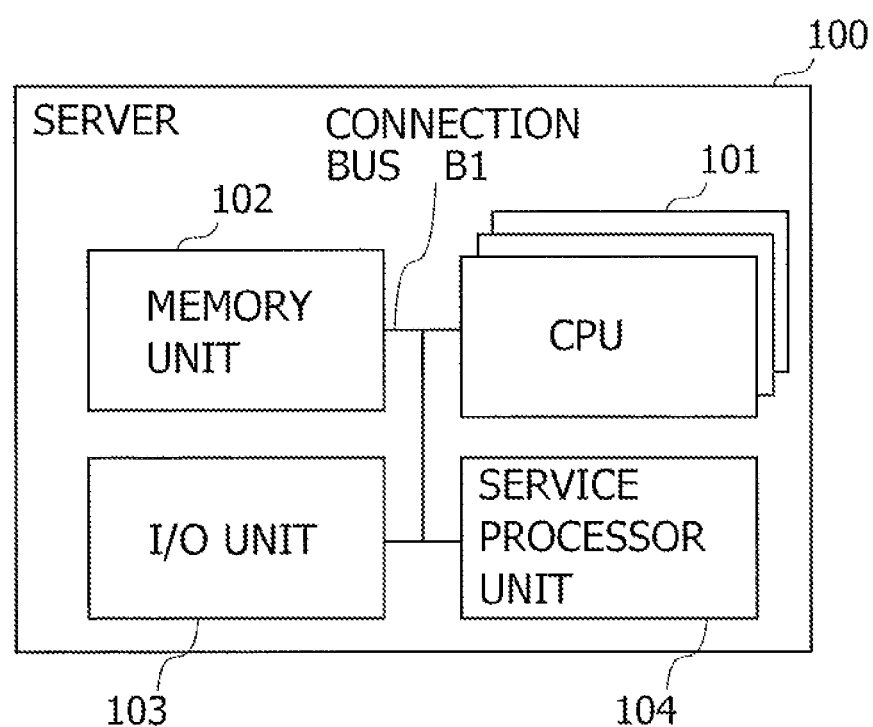
FIG. 1 is a diagram illustrating one example of an outline of a configuration of a server according to an embodiment.

FIG. 1 is a diagram schematically illustrating one example of a configuration of a server 100 according to the embodiment. The server 100 is an information processing apparatus. The server 100 includes Central Processing Units (CPU) 101, a memory unit 102, an Input/Output (I/O) unit 103, and a service processor unit 104. The CPU 101, the memory unit 102, the I/O unit 103 and the service processor unit 104 are interconnected via a connection bus B1.

In the server 100, the CPU 101 controls peripheral devices through running a program stored in the memory unit 102. The server 100 is thereby enabled to execute processes matching with predetermined purposes. The memory unit 102 is a recording medium readable by the server 100. The I/O unit 103 is an interface with I/O devices. An input device including, e.g., a keyboard and a mouse is connected to the I/O unit 103. The CPU 101 and the memory unit 102 are one example of "hardware resources".

The service processor unit 104 is an information processing apparatus mounted in the server 100. The service processor unit 104 is used for a variety of managements of the server 100. For example, an activation key is registered in the service processor unit 104, the activation key permitting use of the hardware resources instanced by the CPU 101 mounted in the server 100. The service processor unit 104 permits an operation of the hardware resources, based on the registered activation key.

The server 100 according to the embodiment includes a plurality of CPUs 101. Number of usable CPUs in the plurality of CPUs 101 is controlled based on the activation key registered in the service processor unit 104. The activation key is provided as an electronic file. According to the embodiment, the activation key retains information for specifying the CPUs 101 of which the operations are permitted. FIG. 2 is a diagram illustrating one example of items of information registered in an activation key 500. The items of information registered in the activation key 500 will be described with reference to FIG. 2. Number of CPUs 101, of which the use is permitted based on the activation key 500 in the CPUs 101 mounted in the server 100, is registered in "number of operable cores". The use of the two CPU cores 101 is permitted based on the activation key 500 illustrated in FIG. 2. A term of validity of the activation key 500 is registered in "term of validity". In the activation key 500 illustrated in FIG. 2, no value is set in the "term of validity". A serial number for identifying the activation key 500 is registered in "activation key S/N". A model name of the server, to which the activation key 500 is applicable, is registered in "applicable model name". Apparatus unique information for identifying the server 100 with permission of the use of the activation key 500 is registered in "apparatus unique information". Various items of information can be adopted as the apparatus unique information as far as being identifiable of the server 100. The apparatus unique information is exemplified by a host name, an IP address, a Media Access Control (MAC) address, and a serial number of the server 100. The activation key 500 is one example of "first authority information". The "apparatus unique information" in FIG. 2 is one example of "apparatus information".

Figure 3:
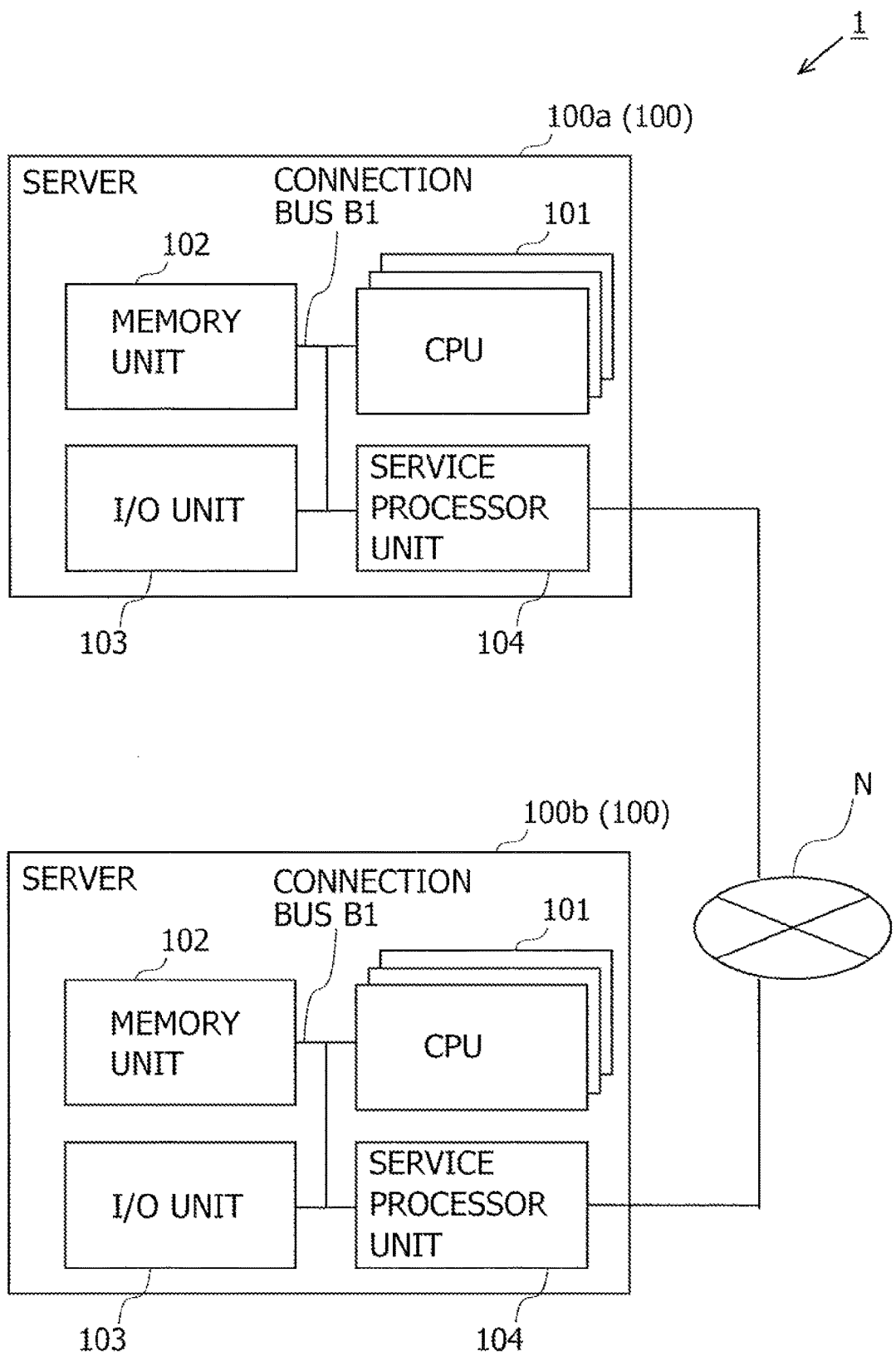
FIG. 3 is a diagram illustrating one example of an information processing system including two servers.

FIG. 3 is a diagram illustrating one example of an information processing system 1 including two servers 100. FIG. 3 depicts the two servers 100 including the service processor units 104 that are interconnected via a computer network N. One of the two servers 100 is designated as a server 100a, while the other is designated as a server 100b. According to the embodiment, the service processor unit 104 of the server 100a copies the activation key 500. The service processor unit 104 of the server 100a transmits the copied activation key 500 to the service processor unit 104 of the server 100b. Each of the servers 100, 100a and 100b is one example of "an information processing apparatus".

Figure 4:
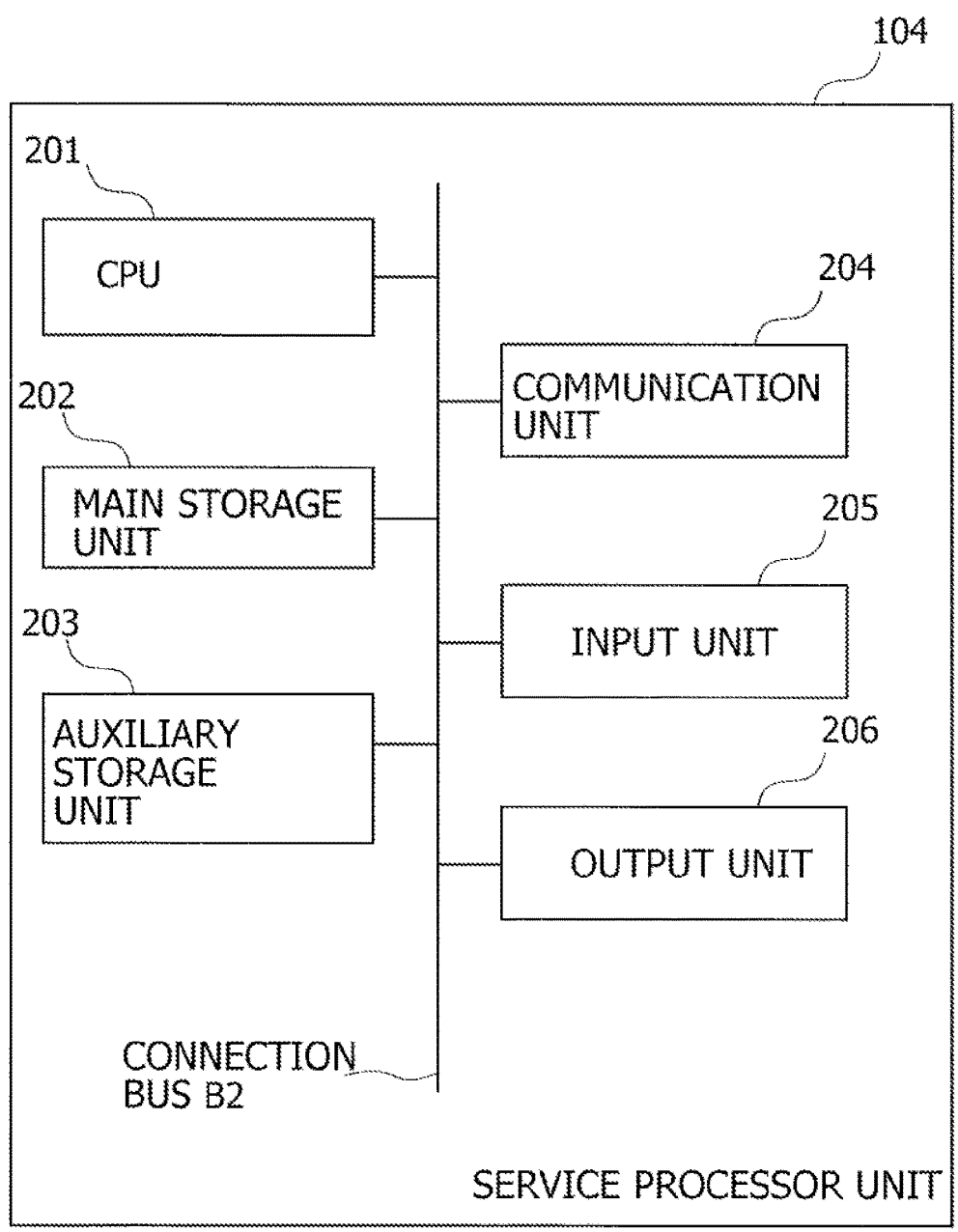
FIG. 4 is a diagram illustrating one example of a hardware configuration of a service processor unit.

FIG. 4 is a diagram illustrating one example of a hardware configuration of the service processor unit 104. The service processor unit 104 includes a CPU 201, a main storage unit 202, an auxiliary storage unit 203, a communication unit 204, an input unit 205, and an output unit 206. The CPU 201, the main storage unit 202, the auxiliary storage unit 203, the communication unit 204, the input unit 205, and the output unit 206 are interconnected via a connection bus B2.

In the service processor unit 104, the CPU 201 deploys a program stored in the auxiliary storage unit 203 onto a work area of the main storage unit 202, and controls peripheral devices through running the program. The service processor unit 104 is thereby enabled to execute processes matching with predetermined purposes. The main storage unit 202 and the auxiliary storage unit 203 are recording mediums readable by the service processor unit 104.

The main storage unit 202 is exemplified as a storage unit accessed directly from the CPU 201. The main storage unit 202 includes a Random Access Memory (RAM) and a Read Only Memory (ROM).

The auxiliary storage unit 203 may store various categories of programs and various items of data on the recording medium in a readable/writable manner. The auxiliary storage unit 203 is also called an external storage device. The auxiliary storage unit 203 stores an Operating System (OS), the various categories of programs, various types of tables and other equivalent software components. The OS includes a communication interface program compiled to transfer and receive the data to and from the external storage devices and other equivalent apparatuses connected via the communication unit 204. The external storage devices and other equivalent apparatuses include other information processing apparatuses and external storage devices that are connected via, e.g., the computer network.

The auxiliary storage unit 203 is exemplified by an Erasable Programmable ROM (EPROM), a Solid State Drive (SSD), and a Hard Disk Drive (HDD). The auxiliary storage unit 203 is also exemplified by a Compact Disc (CD) drive, a Digital Versatile Disc (DVD) drive, and a Blu-ray (registered trademark) Disc (BD) drive. The auxiliary storage unit 203 may be provided by a Network Attached Storage (NAS) or a Storage Area Network (SAN).

The recording medium readable by the service processor unit 104 connotes a non-transitory recording medium capable of accumulating information instanced by data, programs and other equivalent information electrically, magnetically, optically, mechanically or by chemical action, which can be read from the service processor unit 104. Among these non-transitory recording mediums, the mediums removable from the service processor unit 104 are exemplified by a flexible disc, a magneto-optic disc, a CD-ROM, a CD-R/W, a DVD, a Blu-ray disc, a DAT, an 8 mm tape, and a memory card like a flash memory. The hard disc, the SSD or the ROM and other equivalent recording mediums are given as the non-transitory recording mediums fixed within the service processor unit 104.

The communication unit 204 is, e.g., an interface with the computer network N. The communication unit 204 performs communications with the service processor units 104 mounted in other servers 100 via the computer network N.

The input unit 205 is a user interface that accepts an operating instruction and other equivalent instructions from a user and other equivalent persons. The input unit 205 can be exemplified by input devices including a keyboard, a pointing device, a touch panel, an acceleration sensor or a voice input device.

The output unit 206 outputs the data processed by the CPU 201 and the data stored in the main storage unit 202. The output unit 206 can be exemplified by output devices including a Cathode Ray Tube (CRT) display, a Liquid Crystal Display (LCD), a Plasma Display Panel (PDP), an Electroluminescence (EL) panel or a printer.

<Processing Block of Service Processor Unit 104>

Figure 5:
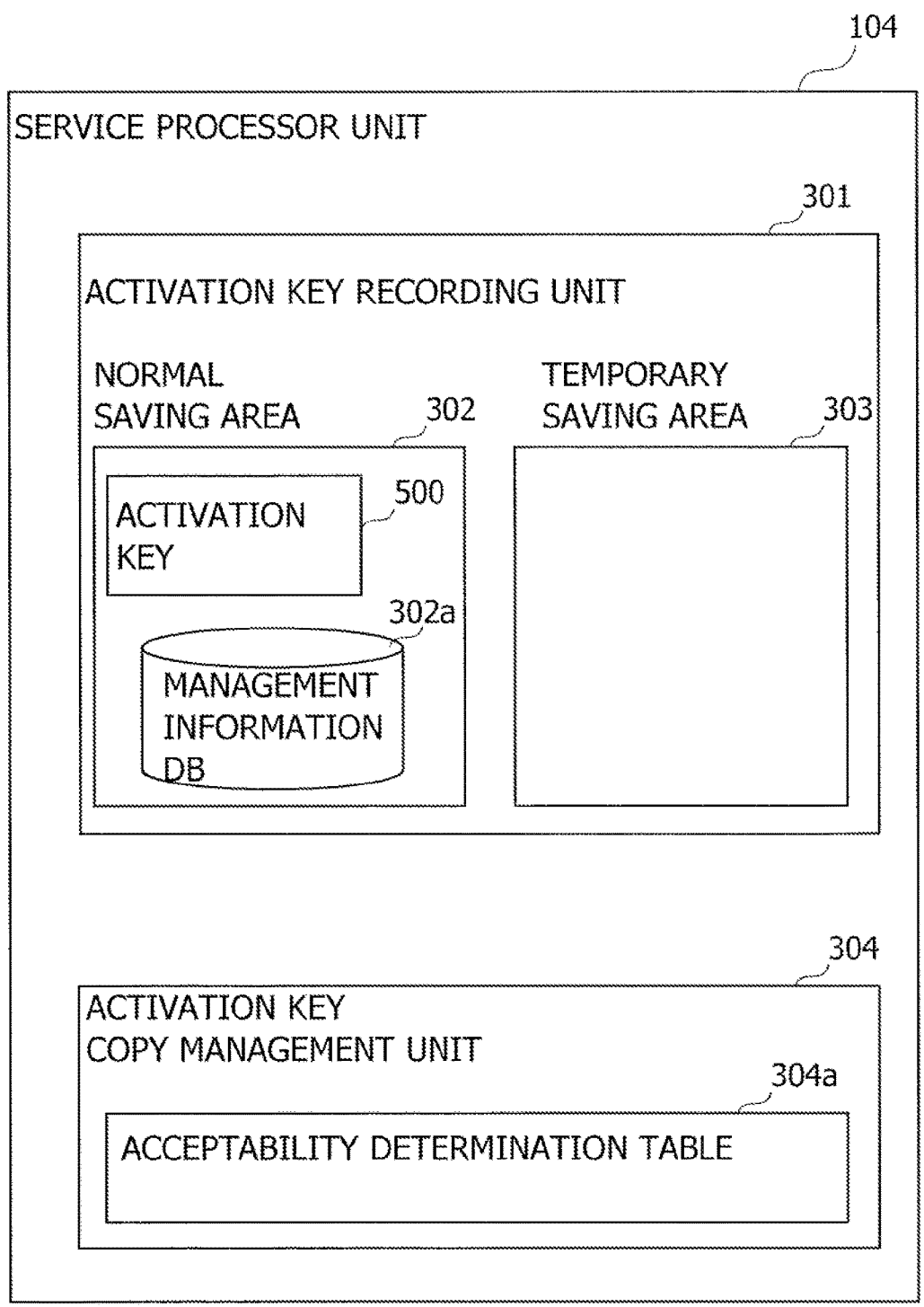
FIG. 5 is a diagram illustrating one example of processing blocks of the service processor unit.

FIG. 5 is a diagram illustrating one example of a processing block of the service processor unit 104. FIG. 5 illustrates an activation copy management unit 304 as the processing block. FIG. 5 further illustrates an activation key recording unit 301 as a storage unit.

The service processor unit 104, as illustrated in FIG. 4, includes the CPU 201 and the main storage unit 202, and executes processing as the processing block illustrated in FIG. 5 in accordance with a computer program deployed in an executable manner on this main storage unit 202. The CPU 201 is also called an Microprocessor (MPU) or a processor. It does not mean that the CPU 201 is limited to a single process, and the CPU 201 may include a multiprocessor configuration. The single CPU 201 connected by a single socket may also include a multicore configuration. At least part of processes of the processing block may be executed by a processor other than the CPU 201, e.g., a dedicated processor including a Digital Signal Processor (DSP), a Graphics Processing Unit (GPU), a numerical data processor, a vector processor and an image processing processor. At least part of the processes of the processing block in FIG. 5 may be executed by an integrated circuit (IC) and other digital circuits. At least part of the processing block may include an analog circuit. The integrated circuit includes an LSI, an Application Specific Integrated Circuit (ASIC), and a Programmable Logic Device (PLD). The PLD includes, e.g., a Field-Programmable Gate Array (FPGA). The processing block may also be configured as a combination of the processor and the integrated circuit. The combination is called, e.g., a microcontroller unit (MCU), a System-on-a-Chip (SoC) or a system LSI or a chipset.

The activation key recording unit 301 includes a normal saving area 302 and a temporary saving area 303. The activation key 500 used in the server 100 is saved in the normal saving area 302. To be specific, the service processor unit 104 mounted in the server 100 permits operations of the CPU cores 101 according to the information of the activation key 500 saved in the normal saving area 302. The normal saving area 302 further includes a management information DB 302a for saving management information indicating copy authority of the activation key 500. The activation key 500 copied from another server 100 and still invalid in the self apparatus is saved in the temporary saving area 303. The activation key recording unit 301 is built up, e.g., on the main storage unit 202 or the auxiliary storage unit 203 in FIG. 4. The activation key recording unit 301, the normal saving area 302 and the management information DB 302a are one example of "a storage unit".

The activation copy management unit 304 copies of the activation key 500 and accepts a copied activation key. The activation copy management unit 304 accepts a copy instruction of the activation key 500 to another server 100 via the input unit 205 of the service processor unit 104. The activation copy management unit 304 checks whether there is the copy authority of the activation key 500, of which the copy is instructed. The check of whether there is the copy authority is determined based on existence or non-existence of the management information set in the activation key 500 given the copy instruction. When having the copy authority, the activation copy management unit 304 executes copying the activation key 500 to another server 100. The activation copy management unit 304, upon receiving the copied activation key 500 from another server 100, accepts this activation key 500.

The activation copy management unit 304 includes an acceptability determination table 304a. The acceptability determination table 304a is used for determining whether to accept the copied activation key 500 from another server 100.

Figure 6:
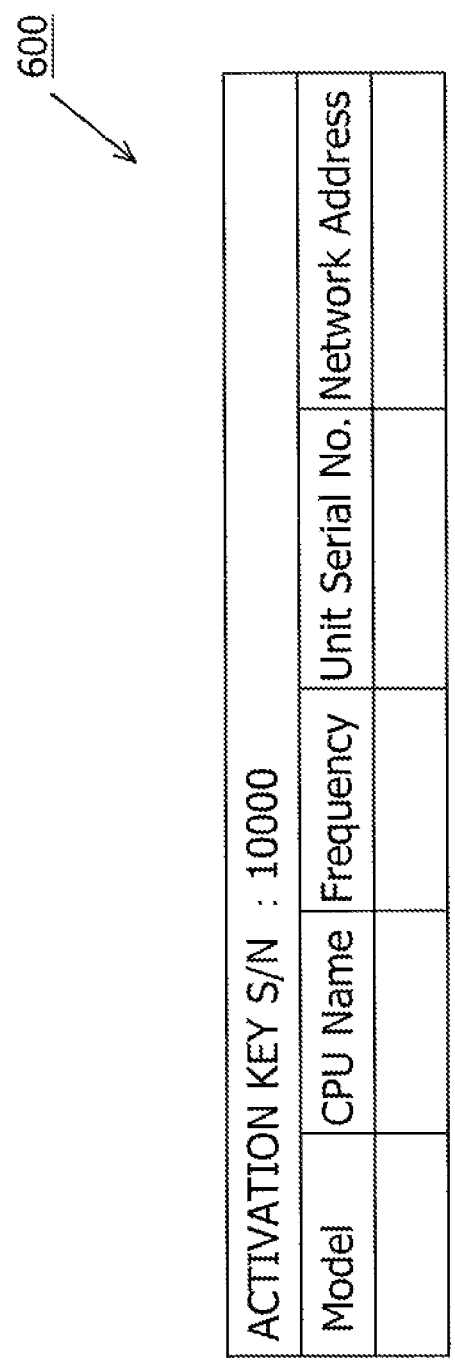
FIG. 6 is a diagram illustrating one example of management information.

FIG. 6 is a diagram illustrating one example of management information 600. The activation copy management unit 304 generates the management information 600, e.g., when the activation key 500 is registered in the service processor unit 104. The management information 600 is generated by being associated with the activation key 500. The management information 600 generated by being associated with the activation key 500 is referred to as "the management information 600 set in the activation key 500". The management information 600 will hereinafter be described with reference to FIG. 6. A serial number of the activation key 500 associated with the management information 600 is registered in the "activation key S/N". The management information 600 illustrated in FIG. 6 is associated with the activation key 500 specified by the serial number "10000". A model name of the server 100 enabled to use the activation key 500 is registered in "Model". Name of the CPU 101 becoming usable by the activation key 500 is registered in "CPU Name". An upper limit of a frequency of the CPU 101 becoming usable by the activation key 500 is registered in "Frequency". A unit unique number is registered in "Unit Serial No.". An Internet Protocol (IP) address of the server 100 enabled to use the activation key 500 is registered in "Network Address". According to the embodiment, the server 100 having the activation key 500 and the management information 600 associated with the activation key 500 has authority for copying the activation key 500 to another server 100. "Model" in FIG. 6 is one example of "model information". The management information 600 is one example of "second authority information".

FIG. 7 is a diagram illustrating one example of the acceptability determination table 304a. The acceptability determination table 304a is used for determining whether to accept the copied activation key 500 from another server 100. A name of a model of the self apparatus is registered in "self model". A name of a model having higher performance than the self model is registered is registered in "higher-order model". A frequency of the CPU 101 is registered in "lower limit frequency".

Figure 8:
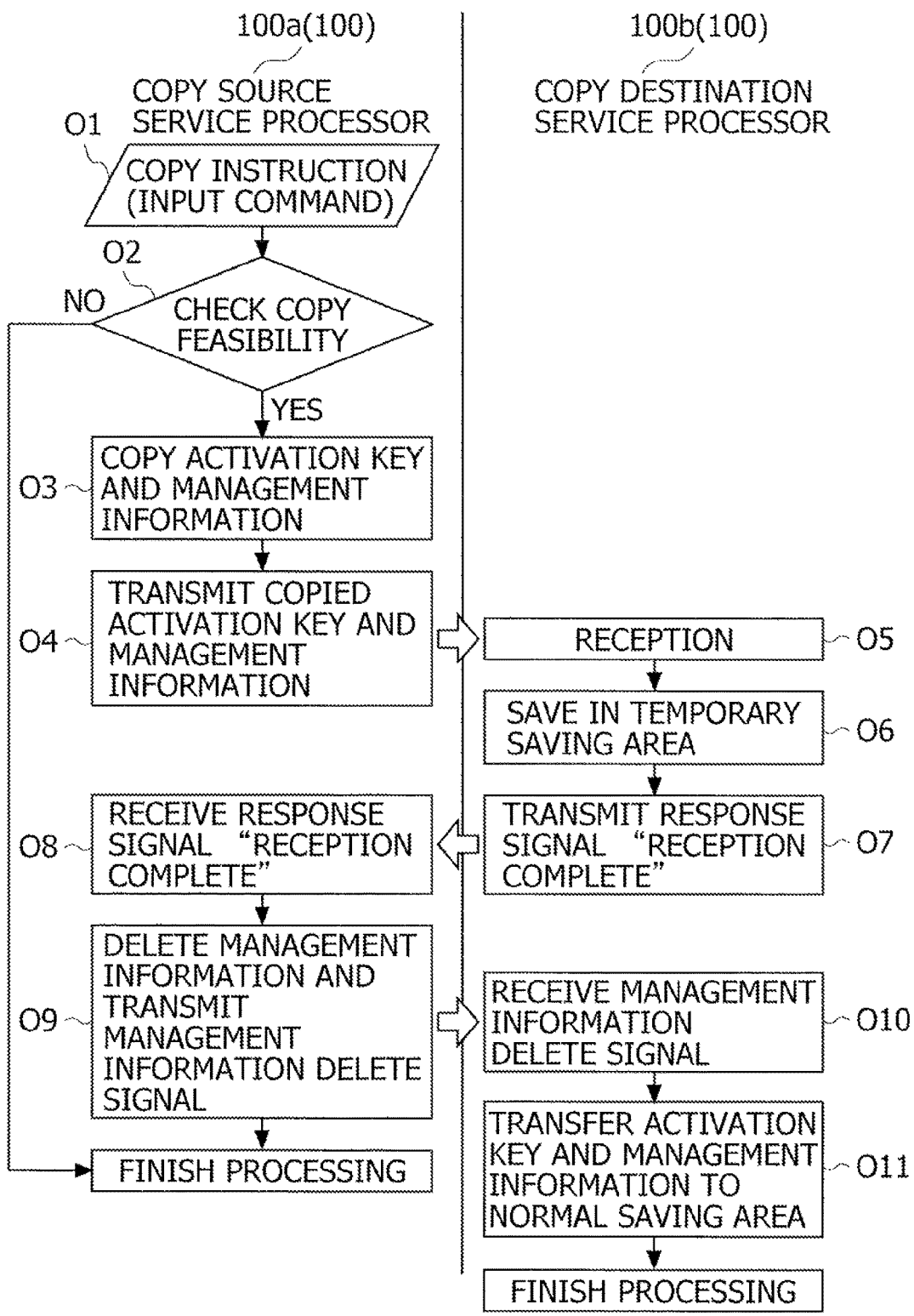
FIG. 8 is a flowchart illustrating one example of an outline of processes of copying the activation key according to the embodiment.

FIG. 8 is a flowchart illustrating one example of an outline of processes of copying the activation key 500 according to the embodiment. In the processes illustrated in FIG. 8, the server 100a copies the activation key 500. The copied activation key 500 is transmitted to the server 100b. The server 100a is one example of "a source apparatus". The server 100b is one example of "a destination apparatus". The outline of the processes of copying the activation key 500 according to the embodiment will hereinafter be described with reference to FIG. 8.

In O1, the activation copy management unit 304 of the server 100a accepts a command for making an instruction of copying the activation key 500 via the input unit 205. The command for making the copy instruction includes designations of, e.g., the serial number of the copy target activation key 500, the apparatus unique information for identifying the copy destination server 100b and the IP address of the copy destination server 100b. The activation copy management unit 304 executing the process in O1 is one example of "an accepting unit". The process in O1 is one example of a process of "accepting a request for transmitting the first authority information to a destination apparatus".

In O2, the activation copy management unit 304 of the server 100a determines whether the copy of the activation key 500 is feasible or not. The copy feasibility determination is made based on whether or not the management information 600 associated with the copy-instructed activation key 500 is registered in the management information DB 302a. When the copy is determined to be feasible (feasible in O2), the processing advances to O3. Whereas when the copy is determined to be unfeasible (unfeasible in O2), the processing comes to an end. The activation copy management unit 304 executing the process in O2 is one example of "a determination unit". The process in O2 is one example of a process of "determining in response to the request whether second authority information used for making a copy feasibility determination of the first authority information is set or not".

In O3, the activation copy management unit 304 of the server 100a copies the activation key 500 instructed to be copied in O1 and the management information 600 associated with this activation key 500. In other words, at a stage of O3, two pairs of activation keys 500 having the same serial number and the management information 600 associated with the activation keys 500 exist within the service processor unit 104 mounted in the server 100a. In O4, the activation copy management unit 304 of the server 100a transmits the activation key 500 copied in the process of O3 and the management information 600 to the service processor unit 104 of the server 100b. The activation copy management unit 304 executing the process in O4 is one example of "a transmission unit". The process in O4 is one example of a process of "transmitting the first authority information together with the second authority information to the destination apparatus when the second authority information is set".

In O5, the activation copy management unit 304 of the server 100b receives the activation key 500 and the management information 600, which are transmitted from the server 100b in the process of O4. In O6, the activation copy management unit 304 of the server 100b stores, in the temporary saving area 303, the activation key 500 and the management information 600 that are received in O5. The activation copy management unit 304 executing the process in O5 is one example of "a reception unit". The process in O5 is one example of a process of "receiving, from a source apparatus, first authority information including information for specifying a hardware resource and second authority information used for determining the copy feasibility of the first authority information, the first authority information being used for determining operation permissibility of the hardware resource.

In O7, the activation copy management unit 304 of the server 100b transmits a reception complete signal to the service processor unit 104 of the server 100a. The reception complete signal is exemplified as a signal of notifying the service processor unit 104 mounted in the server 100a that the reception of the activation key 500 and the management information 600 is completed. The reception complete signal in O7 is one example of "reception complete notification".

In O8, the activation copy management unit 304 of the server 100a receives the reception complete signal transmitted in O7. In O9, the activation copy management unit 304 of the server 100a deletes the management information 600 associated with the activation key 500 transmitted in O4. As a result of the process in O9, the service processor unit 104 mounted in the server 100a loses the authority for copying the activation key 500. In O9, the activation copy management unit 304 of the server 100a further deletes the activation key 500 copied in O3. Thereafter, the activation copy management unit 304 of the server 100a transmits a management information delete signal to the service processor unit 104 mounted in the server 100b. The management information delete signal is exemplified as a signal of notifying the service processor unit 104 mounted in the server 100b that the deletion of the management information 600 is completed. The activation copy management unit 304 executing the process in O9 is one example of "a delete unit". The process in O9 is one example of a process of "deleting the second authority information set in the transmitted first authority information". The process in O9 is also one example of a process of "deleting when receiving reception complete notification transmitted from the destination apparatus permitting an operation of the hardware resource specified by the transmitted first authority information".

In O10, the activation copy management unit 304 of the server 100b receives the management information delete signal transmitted in O9. In O11, the activation copy management unit 304 of the server 100b transfers the activation key 500 saved in the temporary saving area 303 in O6 to the normal saving area 302. The activation copy management unit 304 of the server 100b registers, in the management information DB 302a, the management information 600 saved in the temporary saving area 303 in O6. As a result of transferring the activation key 500 to the normal saving area 302 in the process of O11, the service processor unit 104 of the server 100b permits the operation of the CPU 101 specified by the information registered in the activation key 500. As a result of registering the management information 600 in the management information DB 302a in the process of O11, the service processor unit 104 mounted in the server 100b acquires the copy authority of the activation key 500.

Figure 9A:
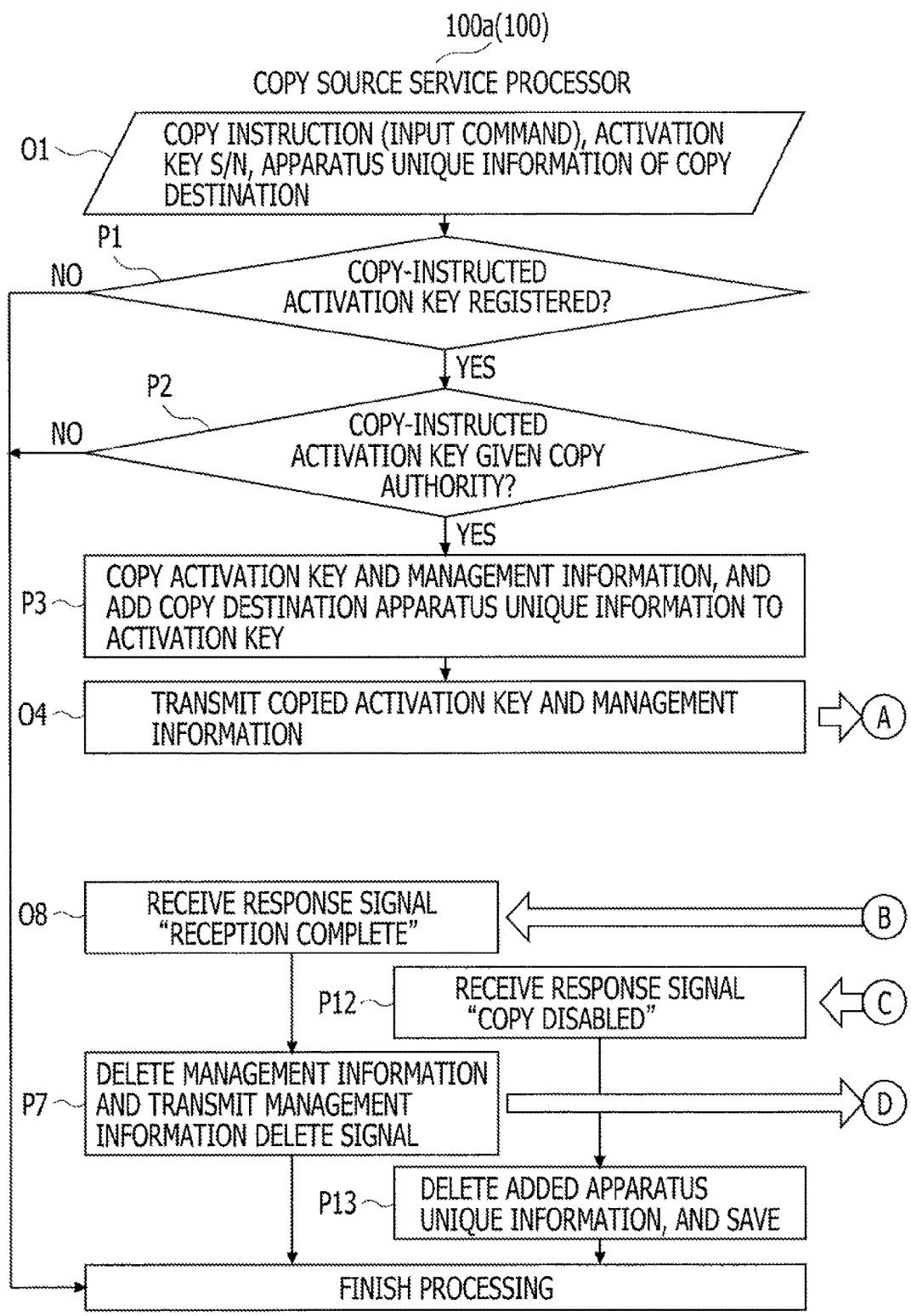
FIG. 9A is a first flowchart illustrating one example of a flow of the processes of copying the activation key according to the embodiment.
Figure 9B:
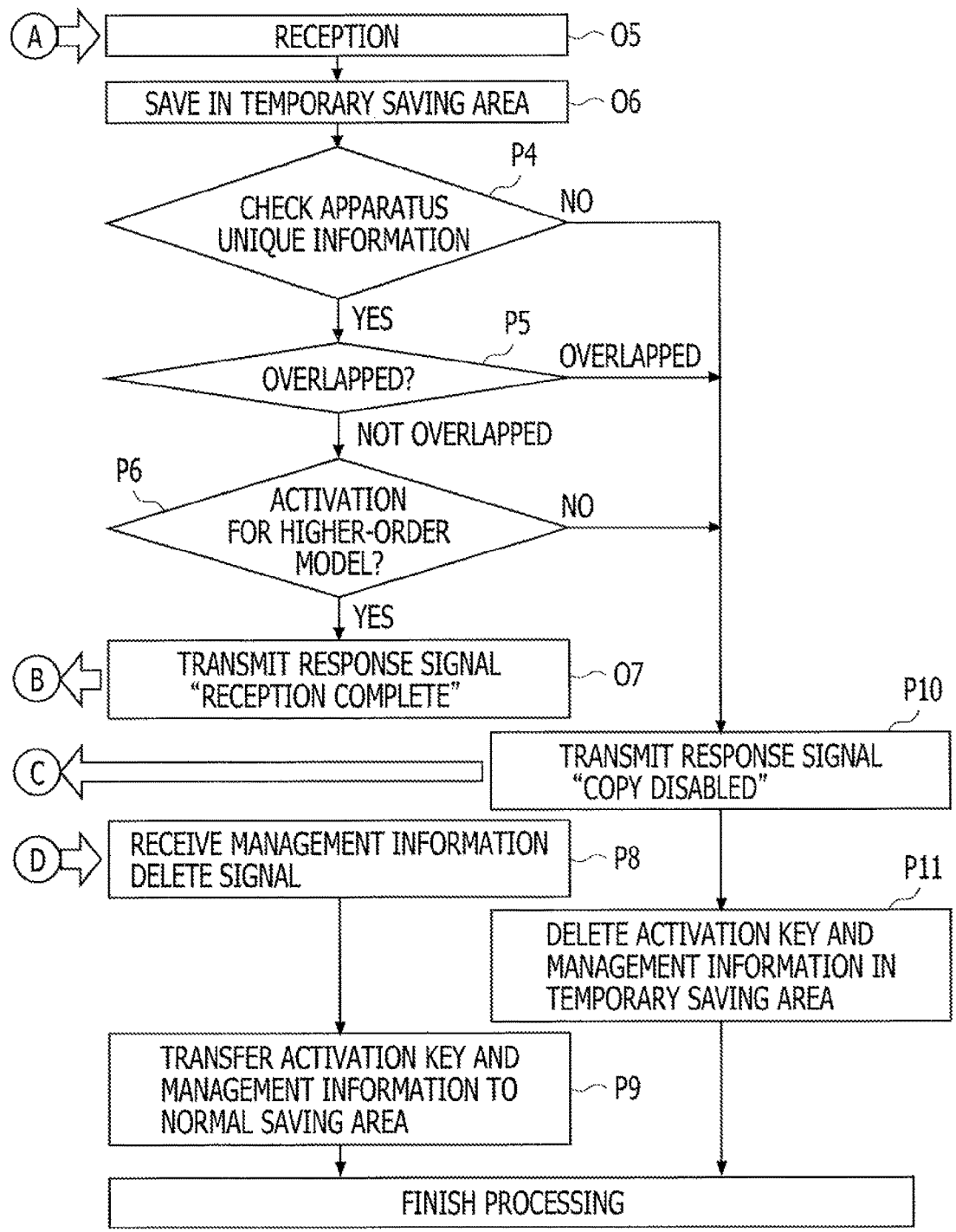
FIG. 9B is a second flowchart illustrating one example of a flow of the processes of copying the activation key according to the embodiment.

FIGS. 9A-9B are flowcharts illustrating one example of a processing flow of copying the activation key 500 according to the embodiment. FIGS. 9A-9B illustrate further detailed processes of the processes in FIG. 8. The processes depicted in FIGS. 9A-9B involve transmitting the activation key 500 to the server 100b from the server 100a in the same way as in the processes illustrated in FIG. 8. The same processes as those in FIG. 8 are marked with the same symbols and numerals, and hence their explanations are omitted. A processing flow of copying the activation key 500 according to the embodiment will hereinafter be described with reference to FIGS. 9A-9B.

The process in O1 is the same as the process in O1 of FIG. 8, and hence its explanation is omitted. In P1, the activation copy management unit 304 of the server 100a determines whether the activation key 500 with the copy being instructed in O1 is registered in the normal saving area 302. When the activation key 500 with the copy being instructed in O1 is registered (YES in P1), the processing advances to O2. Whereas when the activation key 500 with the copy being instructed in O1 is not registered (NO in P1), the activation copy management unit 304 of the server 100a outputs a message purporting that the activation key 500 with the copy being instructed is not registered to the output unit 206, the processing is finished.

In P2, the activation copy management unit 304 of the server 100a determines whether there is the authority for copying the activation key 500 with the copy being instructed in O1. The determination about whether there is the authority for copying is determines based on whether there exists the management information 600 associated with the activation key 500 with the copy being instructed.

In other words, when the management information 600 associated with the activation key 500 exists, it is determined that there is the authority for copying the activation key 500. Whereas when the management information 600 associated with the activation key 500 does not exist, it is determined that there is not the authority for copying the activation key 500. When there is the authority for copying (YES in P2), the processing advances to P3. Whereas when there is not the authority for copying (NO in P2), the activation copy management unit 304 of the server 100a outputs a message purporting that there is not the authority for copying the activation key 500 with the copy being instructed to the output unit 206, and the processing is finished. The processes in P1 and P2 correspond to the process in O2 of FIG. 8.

In P3, the activation copy management unit 304 of the server 100a copies the activation key 500 with the copy being instructed in O1 and the management information 600 associated with the activation key 500. The activation copy management unit 304 of the server 100a adds the apparatus unique information of the copy destination server 100b to a copied activation key 500a. FIG. 10 is a diagram illustrating one example of the process of copying the activation key 500. In FIG. 10, the activation key copied from the activation key 500 is written as the activation key 500a. The apparatus unique information of the copy destination server 100b is additionally written to the activation key 500a. In FIG. 10, the apparatus unique information of the server 100b is "9012345678" that is added to "apparatus unique information 3".

The processes in O4-O6 are the same as the processes in O4-O6 in FIG. 8. To be specific, the copied activation key 500a and the copied management information 600a are transmitted to the service processor unit 104 mounted in the server 100b (O4). The activation copy management unit 304 of the server 100b receives the activation key 500a and the management information 600a (O5). The activation copy management unit 304 of the server 100b saves the received activation key 500a and management information 600a in the temporary saving area 303 (O6).

In P4, the activation copy management unit 304 of the server 100b determines whether the activation key 500a is an activation key directed to the self apparatus. Specifically, when the apparatus unique information of the server 100b is written in the "apparatus unique information" of the activation key 500a, this activation key 500a is determined to be the activation key 500a directed to the self apparatus. When the activation key 500a is directed to the self apparatus (YES in P4), the processing advances to P5. Whereas when the activation key 500a is not directed to the self apparatus (NO in P4), the processing diverts to P10.

In P5, it is determined whether the activation key 500a saved in the temporary saving area 303 is overlapped with the activation key 500 saved in the normal saving area 302. To be more specific, the activation copy management unit 304 of the server 100b determines whether the activation key 500 having the same serial number as the serial number of the activation key 500a saved in the temporary saving area 303 is saved in the normal saving area 302. When the activation key 500 having the same serial number as the serial number of the activation key 500a saved in the temporary saving area 303 is saved in the normal saving area 302, it is determined that the activation keys are overlapped. When the activation keys are overlapped (overlapped in P5), the processing diverts to P10. Whereas when the activation keys are not overlapped (not overlapped in P5), the processing advances to P6.

It is determined in P6 whether the received activation key 500a is the activation key 500a issued to a model equal to the self apparatus or issued to a higher-order model than the self apparatus. The determination in P6 is determined based on the model and the frequency of the CPU 101. Concretely, it is determined whether the model registered in "Model" of the management information 600a associated with the activation key 500a is written in "self model" or "higher-order model" of the acceptability determination table 304a. The activation copy management unit 304 of the server 100b determines whether the frequency registered in "Frequency" of the management information 600a associated with the activation key 500a is equal to or higher than "Lower limit frequency" of the acceptability determination table 304a. When both of the model name and the frequency are determined affirmative (YES in P6), the processing advances to O7. When at least one of the model name and the frequency is determined negative (NO in P6), the processing diverts to P10.

The processes in O7 and O8 are the same as the processes in O7 and O8 of FIG. 8. Hence, their explanations are omitted. In P7, the activation copy management unit 304 of the server 100a deletes the management information 600, 600a and the activation key 500a. Thereafter, the activation copy management unit 304 of the server 100a transmits the management information delete signal to the service processor unit 104 mounted in the server 100b. The process in P7 is one example of a process of "the deleting when receiving reception complete notification transmitted from the destination apparatus permitting an operation of the hardware resource specified by the transmitted first authority information".

In P8, the activation copy management unit 304 of the server 100b receives the management information delete signal transmitted in P7. In P9, the activation copy management unit 304 of the server 100b transfers the activation key 500a to the normal saving area 302 from the temporary saving area 303. The activation copy management unit 304 of the server 100b registers, in the management information DB 302a, the management information 600a saved in the temporary saving area 303. The management information 600a registered in the management information DB 302a is deleted from the temporary saving area 303. Through the process in P9, the activation copy management unit 304 of the server 100b permits the operation of the CPU 101 specified by the information registered in the activation key 500. The activation copy management unit 304 executing the process in P9 is one example of "a control unit". The process in P9 is one example of a process of "permitting an operation of the hardware resource specified by the received first authority information when receiving, from the source apparatus, notification that second authority information set in the received first authority information is deleted from the source apparatus". The processes in P4-P9 are one example of a process of "the processor permits the operation of the hardware resource specified by the received first authority information when the apparatus information indicates a self apparatus, the apparatus information being included in at least one of the received first authority information and the received second authority information". The processes in P6-P9 are one example of a process of "the processor permits the operation of the hardware resource specified by the received first authority information when a model indicated by the model information is a model equal to a self apparatus or a higher-order model than the self apparatus, the model information being included in at least one of the received first authority information and the received second authority information".

In P10, the activation copy management unit 304 of the server 100b transmits a copy disabled signal to the service processor unit 104 mounted in the server 100a. The copy disabled signal is an exemplification of a signal for notifying of a purport that the activation key 500a is not acceptable. In P11, the activation copy management unit 304 of the server 100b deletes the activation key 500a and the management information 600a that are saved in the temporary saving area 303.

In P12, the activation copy management unit 304 of the server 100a receives the copy disabled signal transmitted in P10. In P13, the activation copy management unit 304 of the server 100a deletes the activation key 500a and the management information 600a.

Effect of Embodiment

In the embodiment, the authority for copying the activation key 500 is determined based on whether there is the management information 600 associated with the activation key 500. When the activation key 500 is copied to the server 100b from the server 100a, the management information 600 associated with the activation key 500 is transferred to the server 100b from the server 100a. After copying the activation key 500 to the server 100b, the server 100a deletes the management information 600 associated with the copied activation key 500. According to the embodiment, the authority for copying the activation key 500 can be thereby transferred to the server 100b as well as copying the activation key 500. In other words, according to the embodiment, it is feasible to properly manage the authority for copying the activation key 500, while permitting the copy of the activation key 500 between the servers.

According to the embodiment, the determination about whether there is the authority for copying the activation key 500 is determined based on whether the management information 600 associated with the activation key 500 exists. According to the embodiment, it is therefore feasible to manage the authority for copying the activation key 500 even without using another server for managing the copying authority.

The embodiment involves copying the copy target activation key 500 and the management information 600a associated with the activation key 500 when copying the activation key 500. The embodiment further involves additionally writing the apparatus unique information of the server 100b to the copied activation key 500. It is therefore feasible to restrain the copy source activation key 500 and the management information 600 from being affected even when the activation key 500 is damaged due to some sort of problem when additionally writing the apparatus unique information.

According to the embodiment, the server 100b does not transfer the received activation key 500 to the normal saving area 302 when the apparatus unique information included in the received activation key 500 does not specify the self apparatus. The server 100b does not register the received management information 600 in the management information DB 302a when the apparatus unique information included in the received activation key 500 does not specify the self apparatus. According to the embodiment, it is therefore possible to restrain the activation key 500 not directed to the self apparatus from being used.

The embodiment does not validate the activation key 500 when the received activation key 500 is not the activation key 500 issued to the model equal to the self apparatus or the higher-order model than the self apparatus. Hence, it is feasible to restrain the activation key 500 issued for an inexpensive server 100 from being diverted to the use for an expensive server 100.

According to the embodiment, the server 100a deletes the management information 600 when receiving the reception complete notification from the server 100b. According to the embodiment, it is therefore feasible to restrain the management information of the server 100a from being deleted when failing in copying the activation key 500 and the management information 600 to the server 100b from the server 100a.

According to the embodiment, it is determined whether to accept the activation key 500a, based on "Model" of the management information 600a associated with the received activation key 500a and the acceptability determination table 304a. In this determination, the activation key 500a is determined to be accepted when the target apparatus, to which the activation key 500a is issued, is equal to the same model as the self apparatus or the higher-order model than the self apparatus. According to the embodiment, it is therefore possible to restrain the activation key 500a from being validated, which is issued toward a less expensive model than the self apparatus.

Note that the CPU 101 is validated by the activation key 500 in the embodiment. The hardware resource as a target to be validated by the activation key 500 is not, however, limited to the CPU 101. The target hardware resource to be validated by the activation key 500 may also be, e.g., the memory unit 102 or the I/O unit 103.

The embodiment involves copying the activation key 500 and the management information 600 in O3 of FIG. 8 and P3 of FIG. 9A. The embodiment also involves additionally writing the apparatus unique information of the copy destination apparatus to the copied activation key 500 and the copied management information 600. However, the embodiment may omit copying the activation key 500 and the management information. It may be sufficient that the apparatus unique information is additionally written to the original activation key 500, e.g., in the process in P3 of FIG. 9A when omitting the copy. It may also be sufficient that the added apparatus unique information is deleted from the original activation key 500 in the process in P13 of FIG. 9A when omitting the copy.

The embodiment and the modified examples, which are disclosed so far, can be respectively combined.

The server 100 is capable of restraining the spread of the authority for copying the authority information, while permitting the copy of the authority information.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory configured to store first authority information, the first authority information including information for specifying a hardware resource and a serial number for identifying the first authority information, the first authority information being used for determining whether or not to permit operation of the hardware resource; and
a processor coupled to the memory and the processor configured to perform:
accepting a request for transmitting the first authority information to a destination apparatus;
determining, in response to the request, whether the memory stores second authority information including the serial number of the first authority information;
transmitting the first authority information to the destination apparatus together with the second authority information when the memory stores the second authority information including the serial number of the first authority information; and
deleting the second authority information including the serial number of the transmitted first authority information.

2. The information processing apparatus according to claim 1, wherein the processor executes the deleting when receiving reception complete notification transmitted from the destination apparatus permitting an operation of the hardware resource specified by the transmitted first authority information.

3. An information processing apparatus comprising:
a memory; and
a processor coupled to the memory and the processor configured to perform:
receiving, from a source apparatus, first authority information including information for specifying a hardware resource and a serial number for identifying the first authority information and second authority information including the serial number of the first authority information, the first authority information being used for determining whether or not to permit operation of the hardware resource; and
permitting an operation of the hardware resource specified by the received first authority information when receiving, from the source apparatus, notification that second authority information including the serial number of the received first authority information is deleted from the source apparatus.

4. The information processing apparatus according to claim 3, wherein
at least one of the first authority information and the second authority information further includes apparatus information indicating an information processing apparatus enabled to use the first authority information, and
the processor permits the operation of the hardware resource specified by the received first authority information when the apparatus information indicates a self apparatus, the apparatus information being included in at least one of the received first authority information and the received second authority information.

5. The information processing apparatus according to claim 3, wherein
at least one of the first authority information and the second authority information further includes model information indicating a model of the information processing apparatus becoming an issuance target apparatus of the first authority information, and
the processor permits the operation of the hardware resource specified by the received first authority information when a model indicated by the model information is a model equal to a self apparatus or a higher-order model than the self apparatus, the model information being included in at least one of the received first authority information and the received second authority information.

6. The information processing apparatus according to claim 1, wherein the information for specifying the hardware resource includes at least one of information for specifying a processor and information for specifying a memory.

7. An information processing system including a first information processing apparatus and a second information processing apparatus,
the first information processing apparatus comprising:
a first memory configured to store first authority information, the first authority information including information for specifying a hardware resource and a serial number for identifying the first authority information, the first authority information being used for determining whether or not to permit operation of the hardware resource; and
a first processor coupled to the first memory and the first processor configured to perform:
accepting a request for transmitting the first authority information to the second information processing apparatus;
determining, in response to the request, whether the first memory stores second authority information including the serial number of the first authority information;
transmitting the first authority information to the second information processing apparatus together with the second authority information when the first memory stores the second authority information including the serial number of the first authority information; and
deleting the second authority information including the serial number of the transmitted first authority information,
the second information processing apparatus comprising:
a second memory; and
a second processor coupled to the second memory and the second processor configured to perform:
receiving the transmitted first authority information and the second authority information; and
permitting an operation of the hardware resource specified by the received first authority information.

8. The information processing system according to claim 7, wherein
the second processor transmits reception complete notification to the first information processing apparatus when permitting the operation of the hardware resource specified by the received first information processing apparatus, and
the first processor executes the deleting when receiving the reception complete notification from the second information processing apparatus.

9. The information processing system according to claim 7, wherein
the first processor transmits deletion complete notification to the second information processing apparatus when completing the deleting, and
the second processor permits the operation of the hardware resource specified by the received first information processing apparatus when receiving the deletion complete notification.

10. The information processing system according to claim 7, wherein
- at least one of the first authority information and the second authority information further includes apparatus information indicating an information processing apparatus enabled to use the first authority information, and
- the second processor permits the operation of the hardware resource specified by the received first authority information when the apparatus information indicates a self apparatus, the apparatus information being included in at least one of the received first authority information and the received second authority information.

11. The information processing system according to claim 7, wherein
- at least one of the first authority information and the second authority information further includes model information indicating a model of the information processing apparatus becoming an issuance target apparatus of the first authority information, and
- the second processor permits the operation of the hardware resource specified by the received first authority information when a model indicated by the model information is a model equal to a self apparatus or a higher-order model than the self apparatus, the model information being included in at least one of the received first authority information and the received second authority information.

12. The information processing system according to claim 7, wherein the information for specifying the hardware resource includes at least one of information for specifying a processor and information for specifying a memory.

* * * * *